(12) United States Patent
Kan

(10) Patent No.: US 8,422,789 B2
(45) Date of Patent: Apr. 16, 2013

(54) IMAGE DISCRIMINATION DEVICE AND IMAGE ATTRIBUTE DISCRIMINATION METHOD

(75) Inventor: Nariyasu Kan, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 340 days.

(21) Appl. No.: 12/876,945

(22) Filed: Sep. 7, 2010

(65) Prior Publication Data

US 2011/0058744 A1 Mar. 10, 2011

(30) Foreign Application Priority Data

Sep. 9, 2009 (JP) ................................ 2009-208605

(51) Int. Cl.
*G06K 9/46* (2006.01)

(52) U.S. Cl.
USPC ............ 382/190; 358/1.9; 358/464; 382/176; 382/266

(58) Field of Classification Search .................... 358/1.9, 358/462, 464; 382/170, 176, 190, 199, 224, 382/292
See application file for complete search history.

(56) References Cited

U.S. PATENT DOCUMENTS

| | | | | |
|---|---|---|---|---|
| 5,787,195 A * | 7/1998 | Tsujimoto et al. | ............ | 382/176 |
| 6,167,150 A * | 12/2000 | Michael et al. | ............... | 382/149 |
| 6,697,537 B2 * | 2/2004 | Norimatsu | .................... | 382/275 |
| 7,043,091 B2 * | 5/2006 | Michel | .......................... | 382/266 |
| 7,133,559 B2 * | 11/2006 | Yamazaki | ...................... | 382/199 |
| 8,009,908 B2 * | 8/2011 | Yago | ............................. | 382/170 |
| 2004/0234134 A1 * | 11/2004 | Fuchigami | ................... | 382/199 |
| 2007/0086658 A1 * | 4/2007 | Kido | ............................ | 382/199 |
| 2011/0058744 A1 * | 3/2011 | Kan | .............................. | 382/190 |

FOREIGN PATENT DOCUMENTS

| | | |
|---|---|---|
| JP | 2001-061061 | 3/2001 |
| JP | 2004-272557 | 9/2004 |
| JP | 2007-243442 | 9/2007 |

* cited by examiner

*Primary Examiner* — Gregory M Desire
(74) *Attorney, Agent, or Firm* — DLA Piper LLP (US)

(57) ABSTRACT

An image discrimination device discriminates among image attributes indicating image types. An edge calculating section calculates an edge direction in each processing unit including a predetermined number of pixels of an image. A local connectivity calculating section calculates local connectivity intensity indicating a degree of alignment with the edge direction of the surrounding processing unit in each of the processing units based on the calculated edge direction. An image attribute discrimination section discriminates among the image attributes in each attribute discrimination region including a predetermined number of processing units of the image using the local connectivity intensity of the processing unit in the attribute discrimination region.

14 Claims, 17 Drawing Sheets

| PROCESSING UNIT | EDGE DIRECTION | EDGE INTENSITY |
|---|---|---|
| 1 | DOWNWARD RIGHTWARD | +400 |
| 2 | DOWNWARD RIGHTWARD | +350 |
| 3 | DOWNWARD | +200 |
| 4 | DOWNWARD | −200 |
| .. | .. | .. |

| PROCESSING UNIT | LOCAL CONNECTIVITY INTENSITY |
|---|---|
| 1 | Hi |
| 2 | Low |
| 3 | Low |
| 4 | Hi |
| : | : |

| | LOCAL CONNECTIVITY RATIO | EDGE INTENSITY AVERAGE VALUE OF LOCAL CONNECTIVITY Hi PIXEL | | IMAGE ATTRIBUTE |
|---|---|---|---|---|
| (1) | $\alpha \geq 0.5$ | $192 \leq \beta \leq 255$ | → | PRINTED WORD |
| (2) | $\alpha \geq 0.5$ | $0 \leq \beta \leq 191$ | → | HANDWRITING |
| (3) | $\alpha < 0.5$ | $128 \leq \beta \leq 255$ | → | CHARACTER OR GRAPHIC REGION WITH GROUND COLOR |
| (4) | $\alpha < 0.5$ | $0 \leq \beta \leq 127$ | → | PHOTOGRAPH |

# IMAGE DISCRIMINATION DEVICE AND IMAGE ATTRIBUTE DISCRIMINATION METHOD

CROSS-REFERENCE TO RELATED APPLICATIONS

This application claims priority under 35 U.S.C. 119 to Japanese Patent Application No. 2009-208605, filed on Sep. 9, 2009, which application is hereby incorporated by reference in its entirety.

BACKGROUND OF THE INVENTION

1. Field of the Invention

The present invention relates to an image discrimination device and an image attribute discrimination method for discriminating among image attributes.

2. Description of the Related Art

Recently, network multifunction peripherals in which copy, facsimile communication, and network communication functions are exerted in one device are becoming increasingly common for space saving.

Some types of network multifunction peripherals include image discrimination devices that can discriminate among image attributes of pieces of image data obtained by scanning a document with a scanner and extract a character region and the like.

Conventionally, a method for extracting the character region by pattern matching in which character information data is used is well known as a method in which an image discrimination device discriminates among image attributes.

However, a large-capacity memory and a large amount of calculation are unfortunately necessary for such a conventional image discrimination device.

That is, because character information data containing printed words is possibly included in the image, a memory in which a large-capacity of character information data can be stored is necessary. Additionally, in the conventional image discrimination device, a considerable amount of calculation including normalization is necessary for pattern matching in which character information data is used.

Therefore, a large-capacity memory and a large amount of calculation are necessary for conventional image discrimination devices, which causes a problem in that a processing time to extract the character region is lengthened.

SUMMARY OF THE INVENTION

In order to overcome the problems described above, the present invention provides an image discrimination device in which memory capacity and calculation amounts are reduced.

The problems to be solved by the present invention have been described above, and means for solving the problems and its effect will now be described.

To achieve the object, in accordance with an aspect of the present invention, an image discrimination device that discriminates among image attributes indicating image types includes an edge calculating section, a local connectivity calculating section, and an image attribute discrimination section. The edge calculating section calculates an edge direction in each processing unit including a predetermined number of pixels of an image. The local connectivity calculating section calculates a local connectivity intensity indicating a degree of alignment with the edge direction of the surrounding processing unit in each of the processing units based on the calculated edge direction. The image attribute discrimination section discriminates among the image attributes in each attribute discrimination region including a predetermined number of processing units of the image using the local connectivity intensity of the processing unit in the attribute discrimination region.

Accordingly, the image attributes are discriminated from each other in each attribute discrimination region of the image using the local connectivity intensity. Neither a large-capacity memory nor a large amount of calculation is necessary to calculate the local connectivity intensity. Therefore, the memory capacity and the calculation amount can be reduced in discriminating among the image attributes.

Preferably, the edge calculating section further calculates edge intensity in each of the processing units of the image, and the image attribute discrimination section further discriminates among the image attributes in each of the attribute discrimination regions of the image using the edge intensity of the processing unit in the attribute discrimination region.

Accordingly, the image attributes are further discriminated from each other in each attribute discrimination region of the image using the edge intensity. Neither a large-capacity memory nor a large amount of calculation is necessary to calculate the edge intensity. Therefore, the memory capacity and the calculation amount can be reduced in discriminating among the image attributes.

Preferably, the edge calculating section performs the calculation by applying a template type first-order differential filter in each of the processing units of the image.

Accordingly, the edge direction or the edge intensity is calculated by applying the template type first-order differential filter. Neither a large-capacity memory nor a large amount of calculation is necessary to perform the calculation in which the template type first-order differential filter is applied. Therefore, the memory capacity and the calculation amount can be reduced in discriminating among the image attributes.

Preferably, the local connectivity calculating section sets processing units on both sides perpendicularly adjacent to an edge direction of an object processing unit that are of a processing unit of an object whose local connectivity is calculated to the surrounding processing units, and the local connectivity calculating section calculates the degree of alignment of the edge direction of the object processing unit with the edge directions of the surrounding processing units as the local connectivity intensity of the object processing unit.

Accordingly, the degree of alignment between the edge direction of the object processing unit and the edge direction of the surrounding processing unit can be calculated as the local connectivity intensity of the object processing unit. Therefore, the local connectivity intensity can simply be calculated, and the memory capacity and the calculation amount can be reduced in discriminating among the image attributes.

Preferably, the image attribute discrimination section discriminates among the image attributes in each of the attribute discrimination regions of the image using a ratio of the number of processing units having high local connectivity intensity and the number of processing units having low local connectivity intensity.

Accordingly, the image attributes are discriminated from each other using the ratio of the number of processing units having high local connectivity intensity and the number of processing units having low local connectivity intensity. Therefore, because the image attributes can be discriminated from each other by the simple calculation in which the ratio is calculated, the memory capacity and the calculation amount can be reduced in discriminating among the image attributes.

Preferably, the image attribute discrimination section determines that the image attribute is a character region in each of the attribute discrimination regions of the image when a local connectivity ratio that is of a value in which the number of processing units having high local connectivity intensity is divided by the number of processing units having low local connectivity intensity is not lower than a predetermined first threshold. Preferably, the image attribute discrimination section determines that the image attribute is a character or graphic region with ground color or a photograph region in each of the attribute discrimination regions of the image when the local connectivity ratio is lower than the first threshold.

Accordingly, the image attribute discrimination section determines that the image attribute is the character region when the local connectivity ratio is not lower than the predetermined first threshold. The image attribute discrimination section determines that the image attribute is the character or graphic region with ground color or the photograph region when the local connectivity ratio is lower than the first threshold. Therefore, because the character region and the character or graphic region with ground color or the photograph region can be discriminated by the simple determination, the memory capacity and the calculation amount can be reduced in discriminating among the image attributes.

Preferably, the image attribute discrimination section discriminates among the image attributes in each of the attribute discrimination regions of the image using an edge intensity average value that is of an average value of the edge intensity of each processing unit having high local connectivity intensity in processing units in the attribute discrimination region.

Accordingly, the image attributes are discriminated from each other using the edge intensity average value that is of the average value of the edge intensity of each processing unit having high local connectivity intensity. Therefore, the image attributes can be discriminated from each other by a simple calculation in which the average value of the edge intensity is calculated, and the memory capacity and the calculation amount can be reduced in discriminating among the image attributes.

Preferably, the image attribute discrimination section determines that the image attribute is a printed word region in each of the attribute discrimination regions of the image when a local connectivity ratio that is of a value in which the number of processing units having high local connectivity intensity is divided by the number of processing units having low local connectivity intensity is not lower than a predetermined first threshold and when the edge intensity average value is not lower than a predetermined second threshold, and the image attribute discrimination section determines that the image attribute is a handwriting region in each of the attribute discrimination regions of the image when the local connectivity ratio is not lower than the first threshold and when the edge intensity average value is lower than the second threshold.

Accordingly, the image attribute discrimination section determines that the image attribute is the printed word region when the local connectivity ratio is not lower than the first threshold and when the edge intensity average value is not lower than the second threshold. The image attribute discrimination section also determines that the image attribute is the handwriting region when the local connectivity ratio is not lower than the first threshold and when the edge intensity average value is lower than the second threshold. It is not necessary to perform pattern matching using the character information data, and the printed word region and the handwriting region can be discriminated by the simple determination. Therefore, the memory capacity and the calculation amount can be reduced in discriminating among the image attributes.

Preferably, the image attribute discrimination section determines that the image attribute is a character or graphic region with ground color in each of the attribute discrimination regions of the image when the local connectivity ratio that is of the value in which the number of processing units having high local connectivity intensity is divided by the number of processing units having low local connectivity intensity is lower than a predetermined first threshold and when the edge intensity average value is not lower than a predetermined third threshold, and the image attribute discrimination section determines that the image attribute is a photograph region in each of the attribute discrimination regions of the image when the local connectivity ratio is lower than the first threshold and when the edge intensity average value is lower than the third threshold.

Accordingly, the image attribute discrimination section determines that the image attribute is the character or graphic region with ground color when the local connectivity ratio is lower than the first threshold and when the edge intensity average value is not lower than the third threshold. The image attribute discrimination section also determines that the image attribute is the photograph region in each of the attribute discrimination regions of the image when the local connectivity ratio is lower than the first threshold and when the edge intensity average value is lower than the third threshold. Therefore, the character or graphic region with ground color and the photograph region can be discriminated from each other by the simple determination, and the memory capacity and the calculation amount can be reduced in discriminating among the image attributes.

To achieve the object, in accordance with another aspect of the present invention, an image discrimination device that discriminates among image attributes indicating image types includes an edge calculating section, a local connectivity calculating section, and an image attribute discrimination section. The edge calculating section calculates an edge direction and edge intensity in each processing unit including a predetermined number of pixels of an image. The local connectivity calculating section calculates a local connectivity intensity indicating a degree of alignment with the edge direction of the surrounding processing unit in each of the processing units based on the calculated edge direction. The image attribute discrimination section discriminates among the image attributes in each attribute discrimination region including a predetermined number of processing units of the image using the edge intensity calculated from the local connectivity intensity of the processing unit in the attribute discrimination region.

Accordingly, the image attributes are discriminated from each other in each attribute discrimination region of the image using the edge intensity calculated from the local connectivity intensity. Neither a large-capacity memory nor a large amount of calculation is necessary to calculate the local connectivity intensity and the edge intensity. Therefore, the memory capacity and the calculation amount can be reduced in discriminating among the image attributes.

The invention can also be realized as not only an image discrimination device but also as a network multifunction peripheral in which the image discrimination device is incorporated.

Further, the present invention can be realized as a method having steps of operations of the characteristic processing sections included in the image discrimination device, and the present invention can be realized as an integrated circuit that performs the processing sections.

Further, the present invention can be realized as a program recorded on a non-transitory computer-readable medium causing a computer to execute the steps. The program can be distributed through recording mediums such as a CD-ROM or transmission mediums such as the Internet.

According to the image discrimination device of the present invention, the memory capacity and the calculation amount can be reduced.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 5 is a table illustrating an example of local connectivity data in the embodiment;

FIG. 14 explains examples of a first threshold, a second threshold, and a third threshold.

DETAILED DESCRIPTION OF EMBODIMENTS OF THE INVENTION

An embodiment of the present invention will be described in detail with reference to the drawings.

A configuration of a network multifunction peripheral including an image discrimination device according to an embodiment of the present invention will be described with reference to FIGS. 1 and 2.

Figure 1:
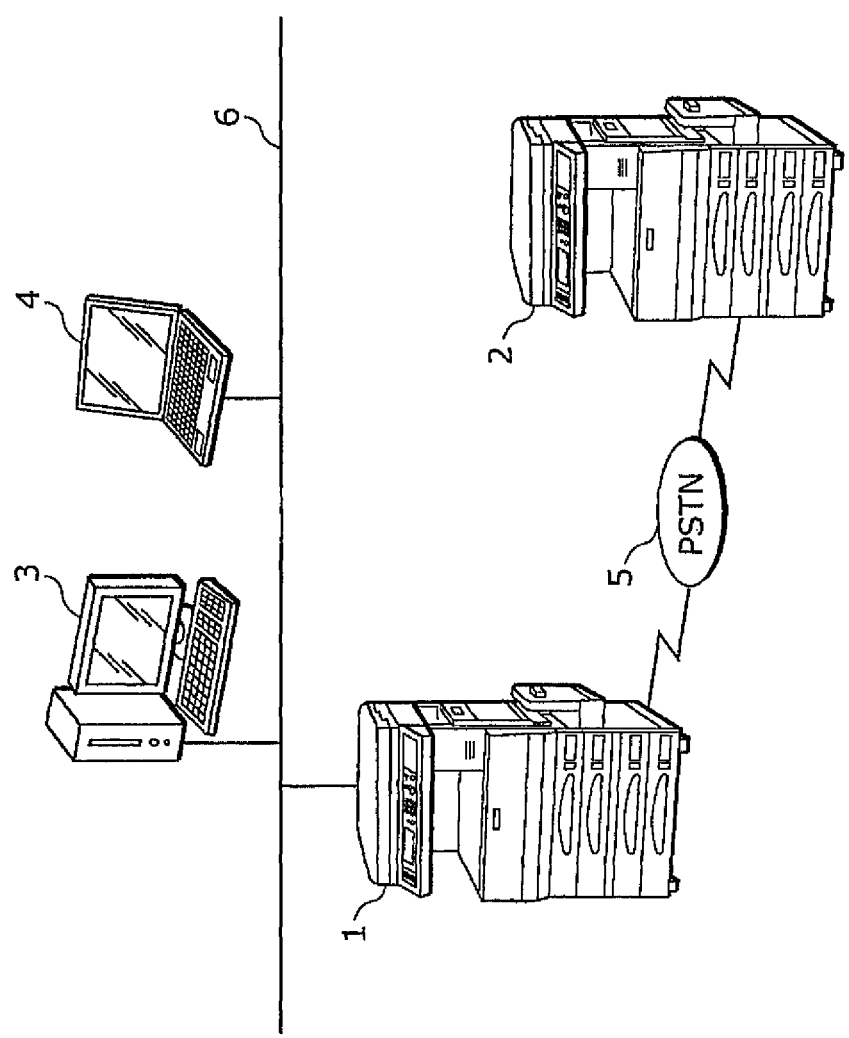
FIG. 1 illustrates an example of a configuration of a communication system including a network multifunction peripheral according to an embodiment of the present invention.

FIG. 1 illustrates an example of a configuration of a communication system including the network multifunction peripheral of the embodiment.

Referring to FIG. 1, the communication system includes network multifunction peripherals 1 and 2, terminal devices 3 and 4, a public switched telephone network (PSTN) 5, and a local area network (LAN) 6.

The network multifunction peripheral 1 is an example of the network multifunction peripheral including the image discrimination device of the embodiment. The network multifunction peripheral 1 is connected to the network multifunction peripheral 2 through the PSTN 5 and connected to the terminal devices 3 and 4 through the LAN 6.

For example, the network multifunction peripheral 1 can send fax a document scanned with a scanner to the network multifunction peripheral 2 through the PSTN 5. The network multifunction peripheral 1 can send the document scanned with the scanner to the terminal devices 3 and 4 through the LAN 6. In the network multifunction peripheral 1, a built-in printer can print the document scanned with the scanner.

Figure 2:
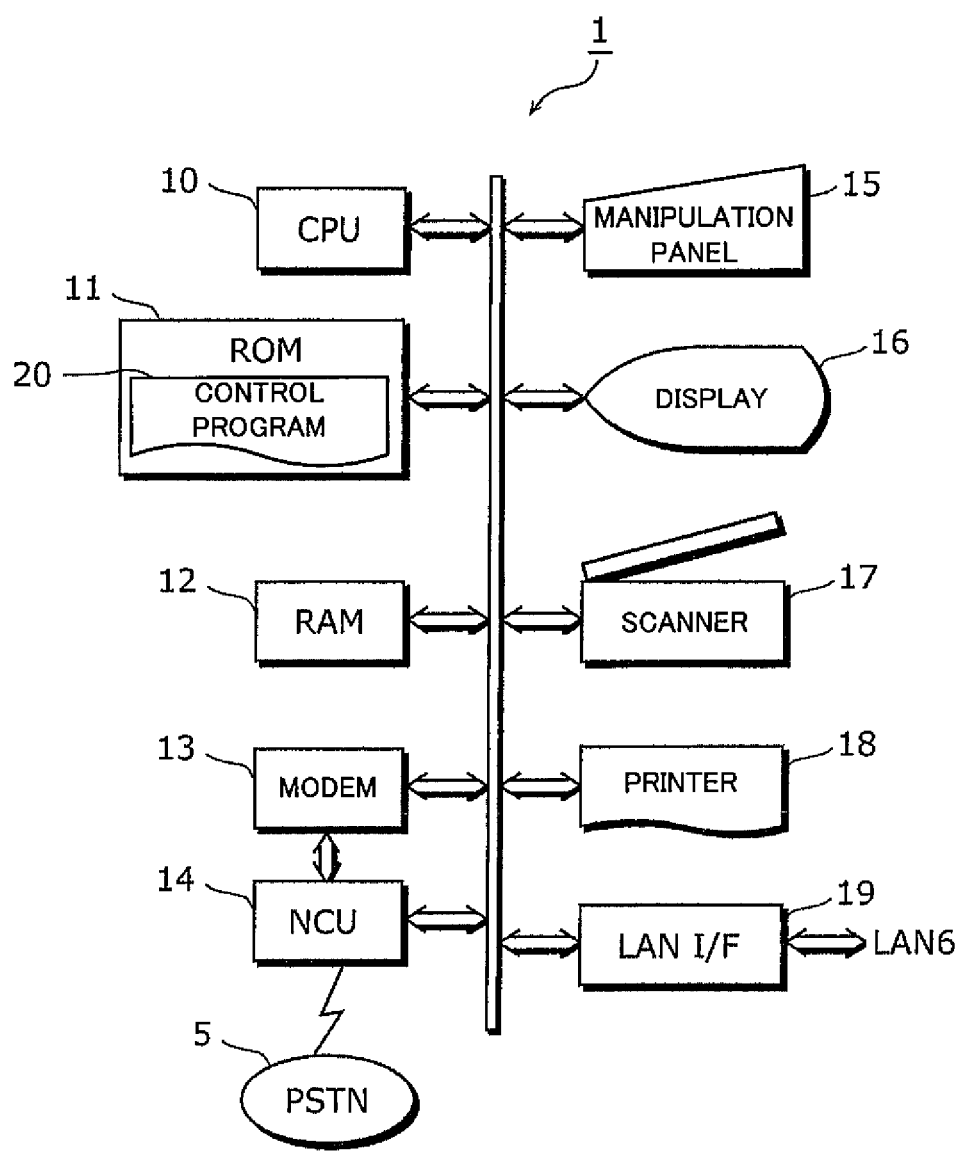
FIG. 2 is a block diagram of a hardware configuration of the network multifunction peripheral of the embodiment.

FIG. 2 is a block diagram illustrating a hardware configuration of the network multifunction peripheral 1 of the embodiment.

Referring to FIG. 2, the network multifunction peripheral 1 includes a central processing unit (CPU) 10, a read only memory (ROM) 11, a random access memory (RAM) 12, a modem 13, a network control unit (NCU) 14, a manipulation panel 15, a display 16, a scanner 17, a printer 18, and a LAN interface (LAN I/F) 19.

The CPU 10 executes a control program 20 stored in the ROM 11, thereby controlling the whole of the network multifunction peripheral 1.

The CPU 10 performs characteristic processing, that is, the CPU 10 discriminates among image attributes of pieces of image data of the document scanned with the scanner 17. Specific processing contents of the discrimination among the image attributes of the pieces of image data are described later.

The ROM 11 is a read only memory in which the control program 20 executed by the CPU 10 is retained.

The RAM 12 is a read-write memory in which work data used to execute the control program 20 by the CPU 10 and the image data obtained from the scanner 17 are retained.

The modem 13 sends the image data retained in the RAM 12 with the image data modulated into a facsimile signal, and the modem 13 demodulates the facsimile signal received from the outside into line data. For example, the modem 13 is a facsimile modem that is pursuant to a G3 standard.

The NCU 14 is a network control device that controls the connection between the modem 13 and the PSTN 5.

The manipulation panel 15 is a touch panel that accepts a user's manipulation.

The display 16 is a display device on which a user's manipulation guide or an operating state of the network multifunction peripheral 1 is displayed. For example, the display 16 is a Liquid Crystal Display (LCD).

The scanner 17 is an image scanning device. Using a charge coupled device (CCD), the scanner 17 optically scans the document under the control of the CPU 10, thereby producing the image data.

The printer 18 is a printing device. For example, under the control of the CPU 10, the printer 18 prints an image that is expressed by the image data retained in the RAM 12.

The LAN I/F 19 is a communication adapter that connects the network multifunction peripheral 1 and the LAN 6. For example, the LAN I/F 19 sends the image data retained in RAM 12 to the terminal device 3 or the like under the control of the CPU 10.

The image discrimination device included in the network multifunction peripheral 1 of the embodiment will be described below.

Figure 3:
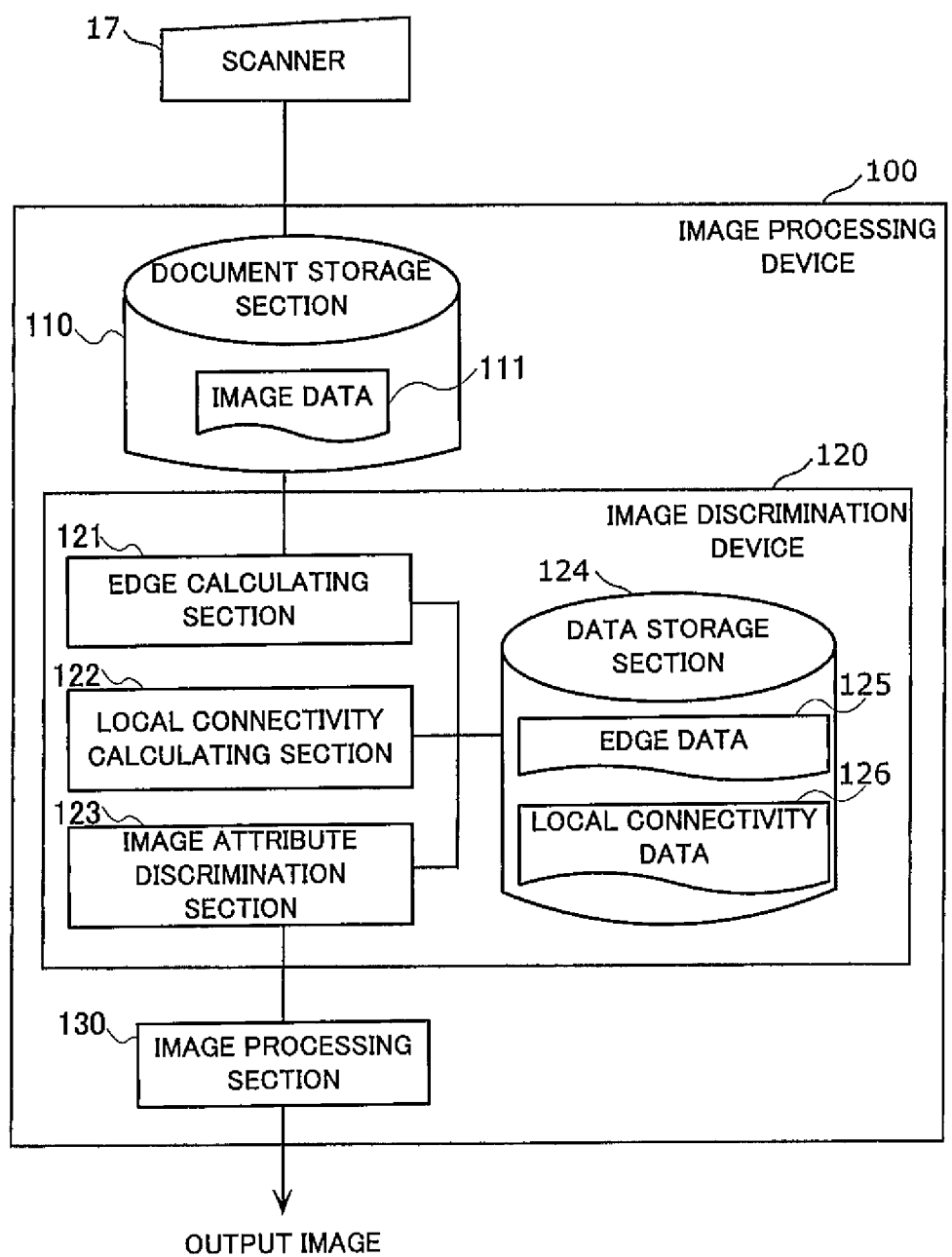
FIG. 3 is a block diagram of a functional configuration of an image processing apparatus including an image discrimination device of the embodiment.

FIG. 3 is a block diagram illustrating a functional configuration of an image processing apparatus 100 including an image discrimination device 120 of the embodiment. That is, FIG. 3 is a block diagram illustrating the configuration of functions concerning the image processing apparatus 100 including the image discrimination device 120 of the embodiment in the functions of the network multifunction peripheral 1 exerted by the hardware configuration illustrated in FIG. 2.

Referring to FIG. 3, the image processing apparatus 100 includes a document storage section 110, the image discrimination device 120, and an image processing section 130.

The document storage section 110 is a storage section in which image data 111 is stored, and specifically the document storage section 110 is realized by the RAM 12. The image data 111 is produced by scanning the document with the scanner 17.

The image discrimination device 120 discriminates among image attributes indicating types of images. As used herein, "discrimination among image attributes" means to discriminate among a printed word region, a handwriting region, a character or graphic region with ground color, and a photograph region.

As illustrated in FIG. 3, the image discrimination device 120 includes an edge calculating section 121, a local connectivity calculating section 122, an image attribute discrimination section 123, and a data storage section 124. The following various pieces of processing performed by the edge calculating section 121, local connectivity calculating section 122, and image attribute discrimination section 123 are specifically realized by the CPU 10 that executes the control program 20.

The edge calculating section 121 calculates an edge direction and edge intensity in each processing unit including a predetermined number of pixels of the image. Specifically the edge calculating section 121 applies a template type first-order differential filter to the image data 111 stored in the document storage section 110 in each processing unit, and the edge calculating section 121 calculates the edge direction and the edge intensity.

As used herein, "edge direction" means a direction in which a pixel characteristic value (contrasting density) of the pixel in the processing unit changes. "Edge intensity" means magnitude of the change in pixel characteristic value of the pixel in the processing unit (change in contrasting density). Edge direction and edge intensity are described in detail later.

The local connectivity calculating section 122 calculates local connectivity intensity indicating a degree of alignment with the edge direction of the surrounding processing unit in each of the processing units based on the edge direction calculated by the edge calculating section 121.

Specifically, the local connectivity calculating section 122 processing units on both sets sides perpendicularly adjacent to an edge direction of an object processing unit that are of the processing unit of the object whose local connectivity is calculated to the surrounding processing units, and the local connectivity calculating section 122 calculates the degree of alignment of the edge direction of the object processing unit with the edge directions of the surrounding processing units as the local connectivity intensity of the object processing unit.

The image attribute discrimination section 123 discriminates among the image attributes in each attribute discrimination region including the predetermined number of pixels of the image using the local connectivity intensity and the edge intensity of the processing unit in the attribute discrimination region. For example, the attribute discrimination region is each of blocks into which the image is divided.

Specifically the image attribute discrimination section 123 discriminates among the image attributes in each of the attribute discrimination regions of the image using a ratio of the number of processing units having high local connectivity intensity and the number of processing units having low local connectivity intensity. The image attribute discrimination section 123 also discriminates among the image attributes in each of the attribute discrimination regions of the image using an edge intensity average value that is of an average value of the edge intensity of each processing unit having high local connectivity intensity in processing units in the attribute discrimination region. The image attribute discrimination processing performed by the image attribute discrimination section 123 is described in detail later.

The data used to discriminate among the image attributes is stored in the data storage section 124. Specifically the data storage section 124 is realized by the RAM 12. As illustrated in FIG. 3, the data storage section 124 includes edge data 125 and local connectivity data 126.

Figure 4:
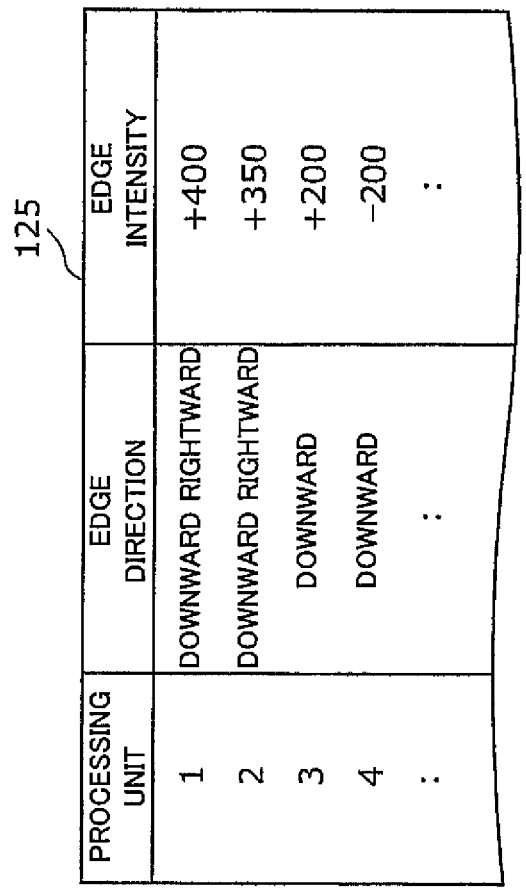
FIG. 4 is a table illustrating an example of edge data in the embodiment.

FIG. 4 is a table illustrating an example of the edge data 125 in the embodiment.

As illustrated in FIG. 4, the edge data 125 is a set of pieces of data indicating the edge direction and edge intensity, calculated by the edge calculating section 121, in each processing unit.

That is, the edge calculating section 121 calculates the edge direction and edge intensity in each processing unit, and the edge calculating section 121 stores the calculated edge direction and edge intensity in the data storage section 124, thereby updating the edge data 125.

Figure 5:
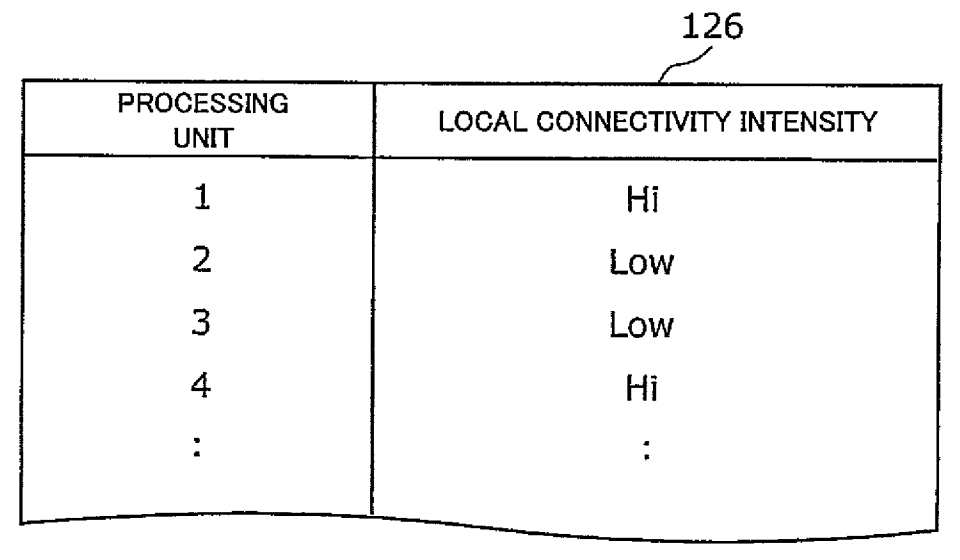

FIG. 5 is a table illustrating an example of the local connectivity data 126 in the embodiment.

As illustrated in FIG. 5, the local connectivity data 126 is a set of pieces of data indicating the local connectivity intensity, calculated by the local connectivity calculating section 122, in each processing unit.

That is, the local connectivity data 126 calculates the local connectivity intensity in each processing unit using the edge direction of the edge data 125, and the local connectivity data 126 stores the calculated local connectivity intensity in the data storage section 124, thereby updating the local connectivity data 126.

The image attribute discrimination section 123 discriminates among the image attributes using the edge intensity of the edge data 125 and the local connectivity intensity of the local connectivity data 126, which are stored in the data storage section 124.

Referring to FIG. 3, the image processing section 130 corrects the image data 111 based on the image attributes among which the image discrimination device 120 discriminates. For example, the image processing section 130 determines that the image attribute determined to be the handwriting region is a tampered portion, and the image processing section 130 corrects the image data 111 so as to remove the handwriting region. Specifically the image processing section 130 is realized by the CPU 10 that executes the control program 20.

The operation of the image discrimination device 120 will be described below.

Figure 6:
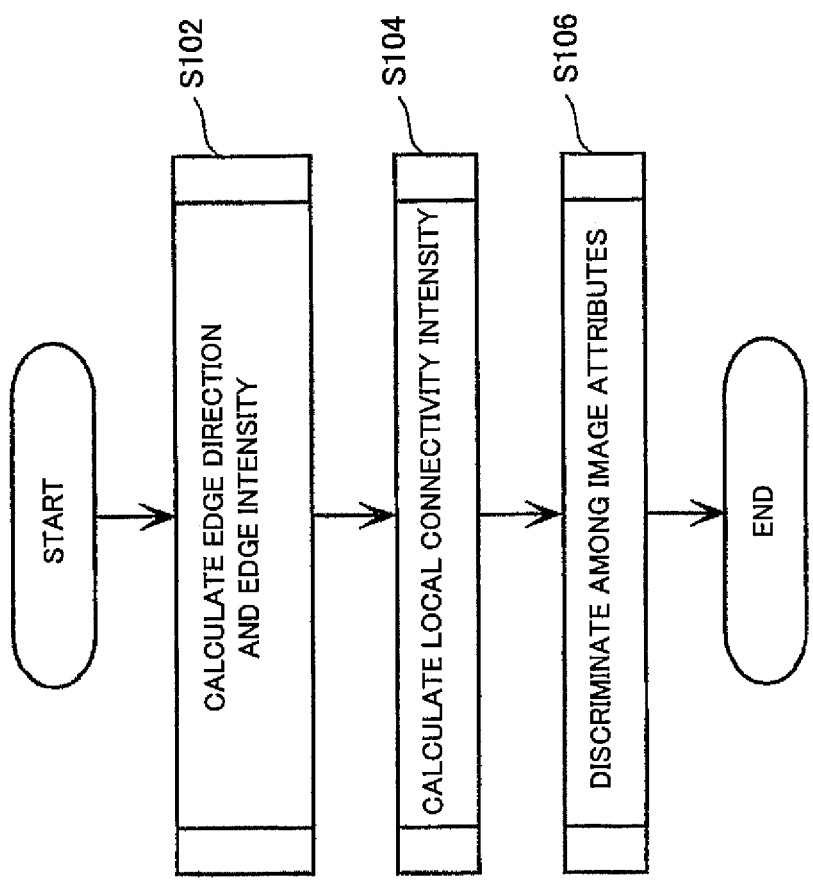
FIG. 6 is a flowchart of an example of operation of the image discrimination device of the embodiment.

FIG. 6 is a flowchart of an example of the operation of the image discrimination device 120 of the embodiment.

As illustrated in FIG. 6, the edge calculating section 121 calculates the edge direction and the edge intensity in each processing unit including the predetermined number of pixels of the image (S102). At this point, while the processing unit is set to one pixel, the edge calculating section 121 calculates the edge direction and the edge intensity in each pixel. The processing in which the edge calculating section 121 calculates the edge direction and the edge intensity is described in detail later.

The local connectivity calculating section 122 calculates the local connectivity intensity in each pixel based on the edge direction calculated by the edge calculating section 121 (S104). The processing in which the local connectivity calculating section 122 calculates the local connectivity intensity is described in detail later.

The image attribute discrimination section 123 discriminates among the image attributes in each block having the predetermined number of pixels using the local connectivity intensity and the edge intensity of each pixel in the block (S104). The processing in which the image attribute discrimination section 123 discriminates among the image attributes is described in detail later.

The processing (S102 of FIG. 6) in which the edge calculating section 121 calculates the edge direction and the edge intensity will be described in detail.

Figure 7:
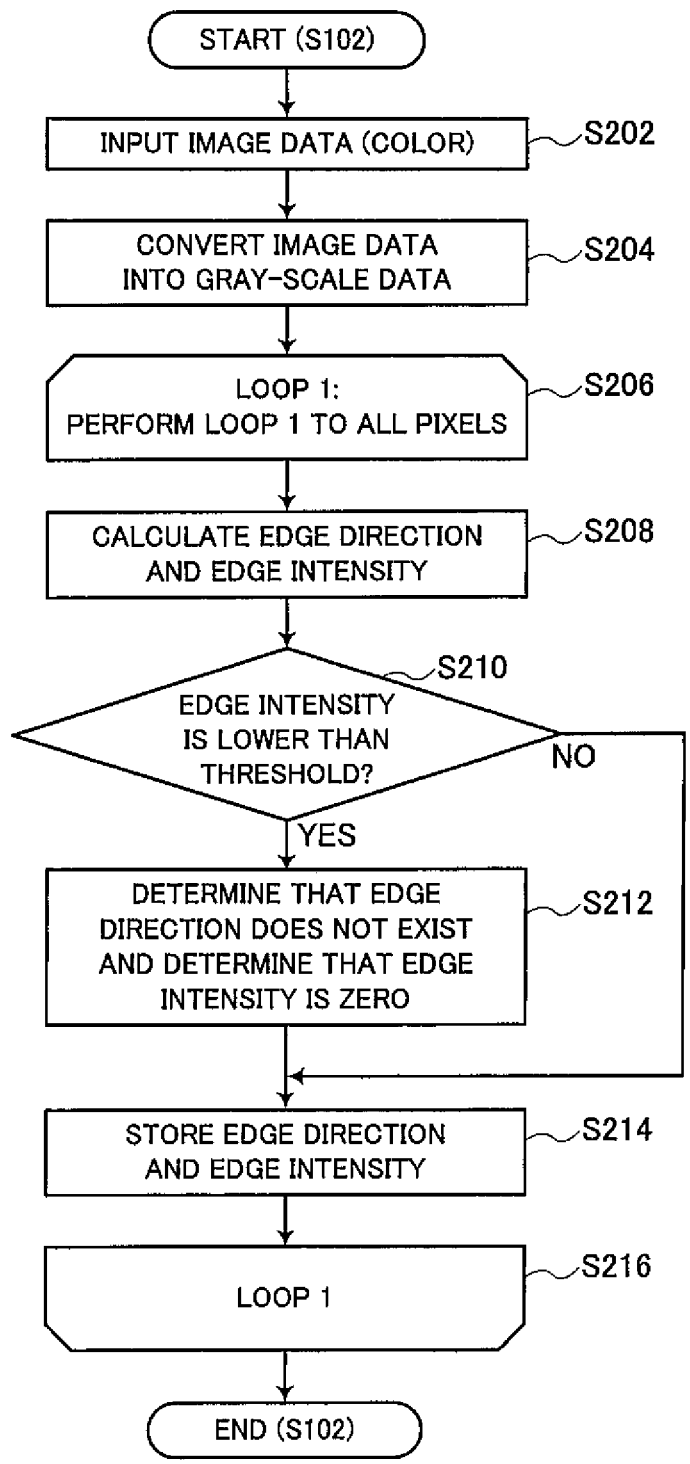
FIG. 7 is a flowchart of an example of processing in which the edge calculating section of the embodiment calculates an edge direction and edge intensity.

FIG. 7 is a flowchart of an example of the processing in which the edge calculating section 121 of the embodiment calculates the edge direction and edge intensity.

As illustrated in FIG. 7, the image data 111 stored in the document storage section 110 is inputted to the edge calculating section 121 (S202). At this point, it is assumed that image data 111 having a color image is inputted to the edge calculating section 121.

The edge calculating section 121 converts the image data 111 into gray-scale image data (S204).

The edge calculating section 121 repeatedly performs the following pieces of processing (S208 to S214) to all the pixels of the converted image data 111 (loop 1: S206 to S216).

The edge calculating section 121 applies a template type first-order differential filter to calculate the edge direction and edge intensity of each pixel (S208).

Figure 8:
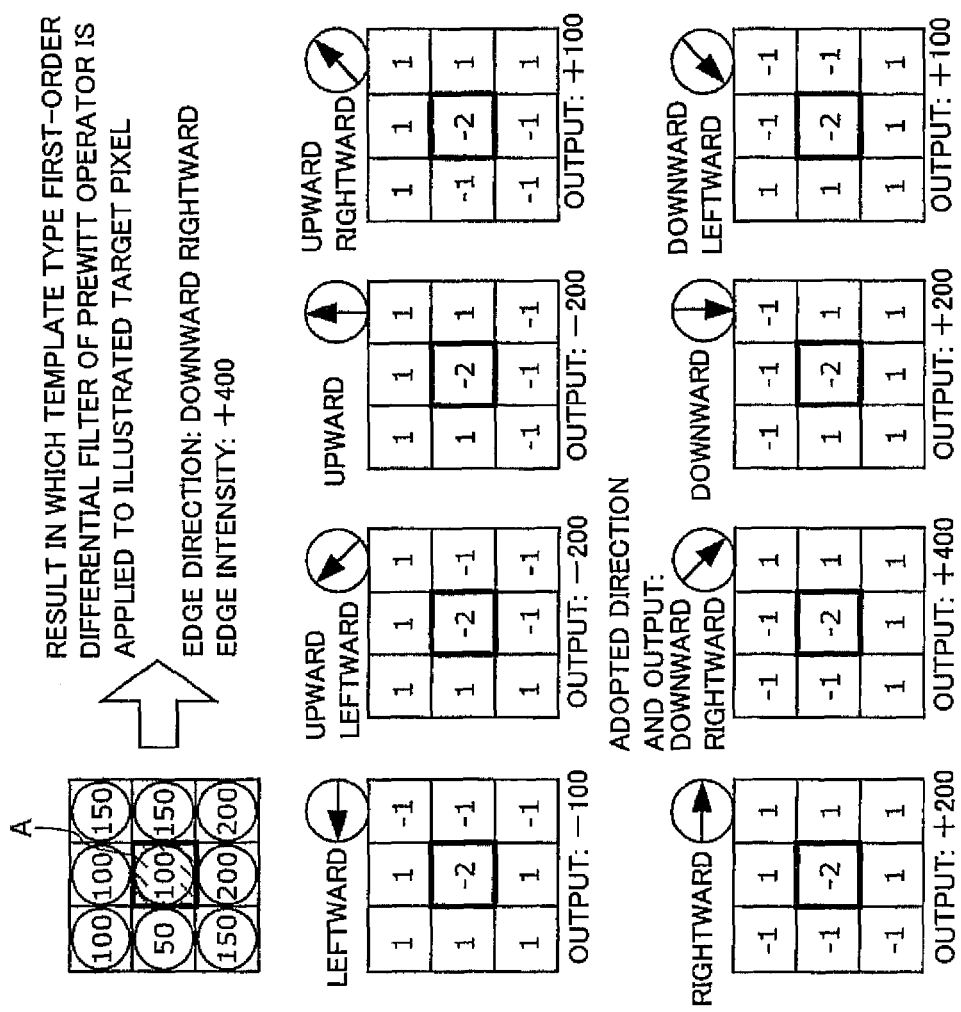
FIG. 8 explains that the edge calculating section of the embodiment calculates the edge direction and edge intensity of each pixel.

FIG. 8 explains that the edge calculating section 121 of the embodiment calculates the edge direction and edge intensity of each pixel.

Specifically, FIG. 8 illustrates the result in which a template type first-order differential filter of a Prewitt operator is applied to a target pixel A that is of the object pixel whose edge direction and edge intensity are calculated.

As illustrated in FIG. 8, the edge calculating section 121 calculates a direction having the largest output value in the output values of directions as the edge direction and calculates the output value in the edge direction as the edge intensity.

Specifically, the edge calculating section 121 calculates the output value that is of a numerical value that is obtained by multiplying the pixel values of the target pixel A and surrounding pixel by a factor illustrated in FIG. 8 and accumulating the products. The edge calculating section 121 calculates the direction in which the output value is maximized as the edge direction. The edge calculating section 121 also calculates the maximum output value as the edge intensity.

In FIG. 8, the edge calculating section 121 calculates a "downward upward" direction in which the output value is maximized at "+400" as the edge direction, and the edge calculating section 121 calculates "+400" as the edge intensity. In the calculation of FIG. 8, it is assumed that the pixel value of each pixel ranges from 0 to 255.

In addition to the Prewitt operator, the template type first-order differential filter includes a Roberts operator, a Robinson operator, and a Kirsch operator. In the edge calculating section 121, the optimum operator is selected to optimally normalize the output value in consideration of the calculation amount and accuracy.

Referring to FIG. 7, the edge calculating section 121 determines whether the calculated edge intensity is lower than a predetermined threshold (S210).

When the calculated edge intensity is lower than a predetermined threshold (YES in S210), indicating that the target pixel is probably a noise that is not regarded as the edge, the edge calculating section 121 determines that the edge direction of the pixel does not exist and also determines that the edge intensity is zero (S212). For example, when an absolute value of the edge intensity is lower than 50, the edge calculating section 121 determines that the edge direction of the pixel does not exist and also determines that the edge intensity is zero.

The edge calculating section 121 stores the determined edge direction and edge intensity in the data storage section 124, thereby updating the edge data 125 (S214).

When the calculated edge intensity is not lower than a predetermined threshold (NO in S210), the edge calculating section 121 stores the calculated edge direction and edge intensity in the data storage section 124, thereby updating the edge data 125 (S214).

The processing steps (S208 to S214) are repeatedly performed to all the pixels of the image data 111 (loop 1: S206 to S216), whereby the processing (S102 of FIG. 6) in which the edge calculating section 121 calculates the edge direction and the edge intensity is ended.

The processing (S104 of FIG. 6) in which the local connectivity calculating section 122 calculates the local connectivity intensity will be described below.

Figure 9:
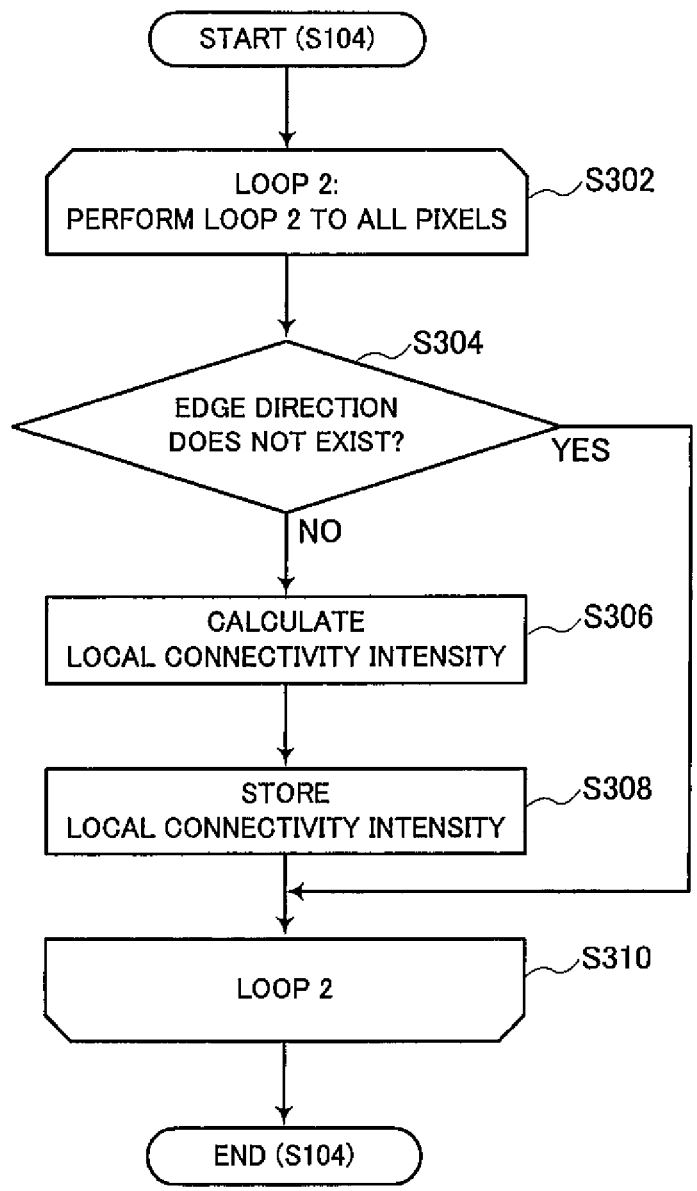
FIG. 9 is a flowchart of an example of processing in which a local connectivity calculating section of the embodiment calculates local connectivity intensity.

FIG. 9 is a flowchart of an example of the processing in which the local connectivity calculating section 122 of the embodiment calculates the local connectivity intensity.

As illustrated in FIG. 9, the local connectivity calculating section 122 repeatedly performs the following processing steps (S304 to S308) to all the pixels of the image data 111 (loop 2: S302 to S310).

The local connectivity calculating section 122 determines whether the edge direction does not exist in the object target pixel whose local connectivity intensity is calculated (S304). Specifically, the local connectivity calculating section 122 refers to the edge direction of the edge data 125, stored in the data storage section 124, to determine whether the edge direction does not exist in the target pixel.

When the edge direction does not exist in the target pixel (YES in S304), the local connectivity calculating section 122 calculates the local connectivity intensity of the next pixel. That is, the local connectivity calculating section 122 does not calculate the local connectivity intensity because the pixel in which the determination that the edge direction does not exist is made is regarded as an uninterested blank region.

When the edge direction exists in the target pixel (NO in S304), the local connectivity calculating section 122 calculates the local connectivity intensity (S306).

Figure 10:
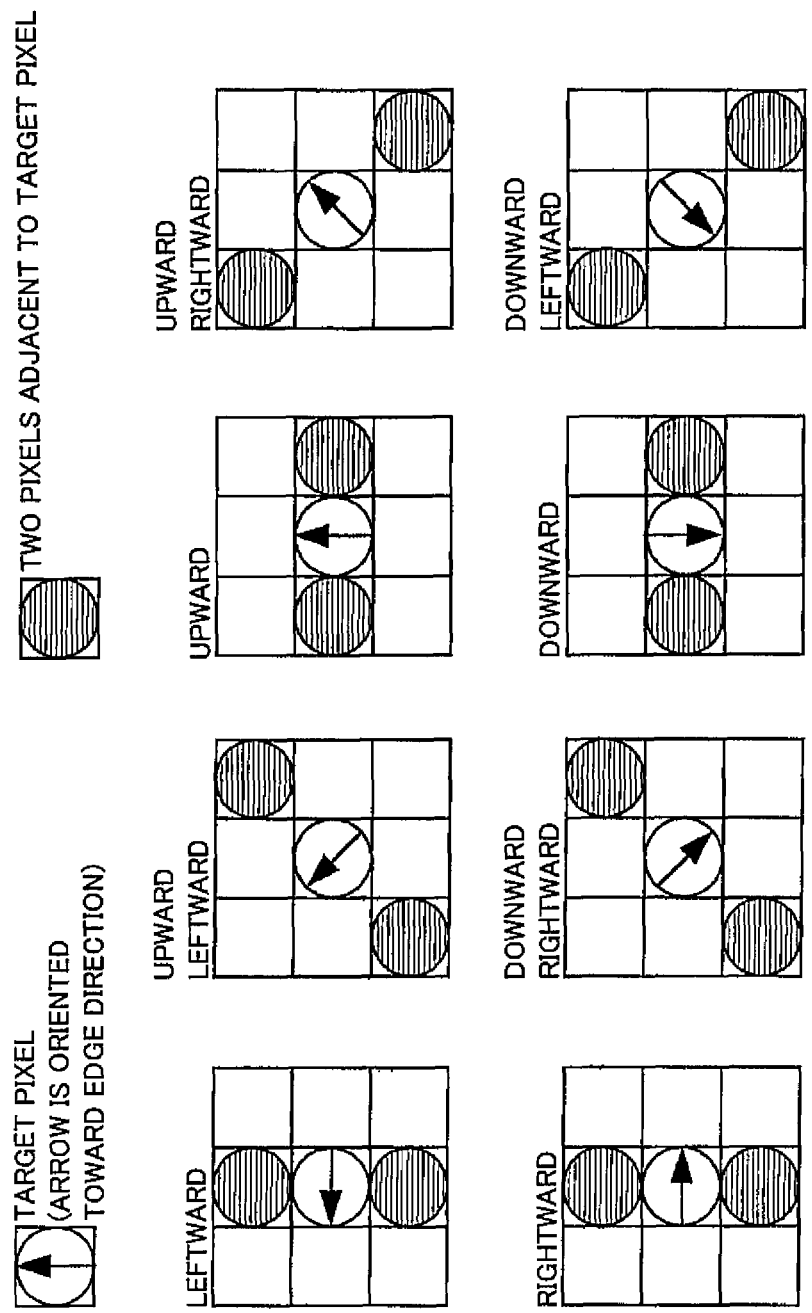
FIG. 10 explains that the local connectivity calculating section of the embodiment calculates the local connectivity intensity.
Figure 11:
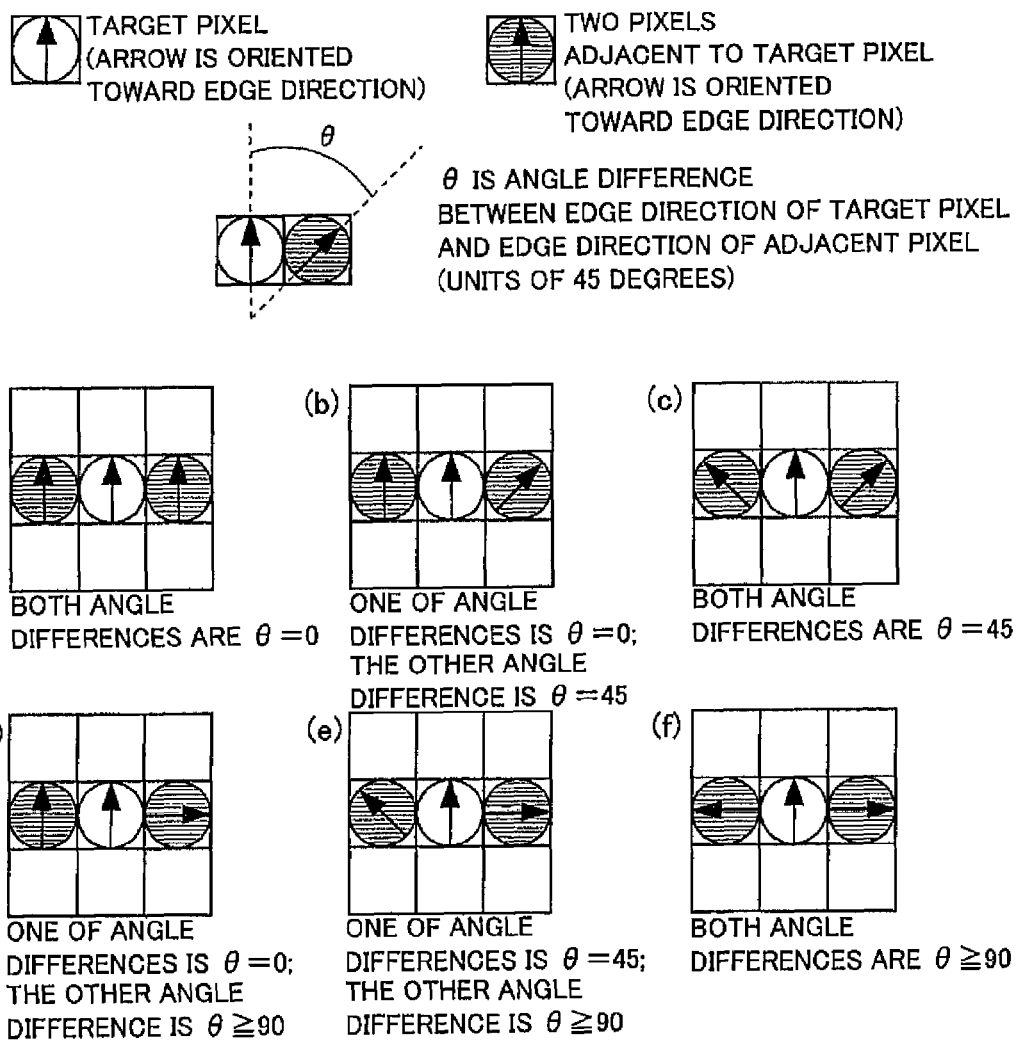
FIG. 11 explains that the local connectivity calculating section of the embodiment calculates the local connectivity intensity.

FIGS. 10 and 11 explain that the local connectivity calculating section 122 of the embodiment calculates the local connectivity intensity.

As illustrated in FIG. 10, the local connectivity calculating section 122 calculates the local connectivity intensity by comparing the edge direction of the target pixel and the edge directions of two pixels on both sides perpendicularly adjacent to the edge direction of the target pixel.

A determination of whether the edge directions are continuously aligned can be made by calculating the local connectivity intensity. The local connectivity calculating section 122 calculates the local connectivity intensity by an angle difference between the edge direction of the target pixel and the edge directions of two pixels on both sides perpendicularly adjacent to the edge direction of the target pixel. For the eight directions, the angle difference takes one of 0 degree, 45 degrees, 90 degrees, 135 degrees, and 180 degrees.

Specifically, the local connectivity calculating section 122 refers to the edge directions of the three pixels, that is, the target pixel and the two pixels on both sides adjacent to the target pixel from the edge data 125 stored in the data storage section 124, and the local connectivity calculating section 122 calculates the angle difference between the target pixel and one of the two pixels on both sides adjacent to the target pixel and the angle difference between the target pixel and the other pixel.

Because the angle difference between the target pixel and the adjacent pixel is unclear when the target pixel is adjacent to the pixel in which the determination that the edge direction does not exist is made, the local connectivity calculating section 122 calculates the local connectivity intensity while setting the angle difference to an intermediate value of 90 degrees.

When at least one of the two pixels on both sides adjacent to the target pixel is the pixel in which the determination that the edge direction does not exist is made, the local connectivity calculating section 122 does not calculate the local connectivity intensity of the target pixel using the angle difference, the target pixel may be classified as the pixel having the low local connectivity intensity in a classification concerning a degree of the local connectivity intensity as described later. This is because the target pixel becomes an end of the edge to interrupt the edge when at least one of the two pixels on both sides adjacent to the target pixel is the pixel in which the determination that the edge direction does not exist is made.

At this point, when both the angle differences between the target pixel and the two adjacent pixels are 0 degrees, a degree in which edge directions are continuously aligned is maximized, and it is said that the local connectivity intensity is high. On the other hand, the alignment of edge directions degrades with increasing angle differences between the target pixel and the two adjacent pixels, and it is said that the local connectivity intensity is low.

In consideration of these facts, for example, the degree of local connectivity intensity can be classified as follows in descending order of local connectivity intensity as illustrated in FIG. 11.

(a) The angle differences between the target pixel and the two adjacent pixels are 0 degrees.

(b) The angle difference between the target pixel and one of the two pixels on both sides adjacent to the target pixel is 0 degree and the angle difference between the target pixel and the other pixel is 45 degrees.

(c) The angle differences between the target pixel and the two adjacent pixels are 45 degrees.

(d) The angle difference between the target pixel and one of the two pixels on both sides adjacent to the target pixel is 0 degrees and the angle difference between the target pixel and the other pixel is 90 degrees or more.

(e) The angle difference between the target pixel and one of the two pixels on both sides adjacent to the target pixel is 45 degrees and the angle difference between the target pixel and the other pixel is 90 degrees or more.

(f) The angle differences between the target pixel and the two adjacent pixels are 90 degrees or more.

There is no clear definition for the standard of the degree of local connectivity intensity, but it is generally said that the pixel corresponding to the item (f) is a noise. In the embodiment, the pixel corresponding to the item (a) is classified as the pixel (hereinafter referred to as a local connectivity Hi pixel) having high local connectivity intensity, and the pixels corresponding to the items (b), (c), (d), (e), and (f) are classified as the pixel (hereinafter referred to as a local connectivity Low pixel) having low local connectivity intensity.

That is, the local connectivity calculating section 122 calculates the local connectivity intensity of the pixel (local connectivity Hi pixel) corresponding to the item (a) as "Hi", and the local connectivity calculating section 122 calculates the local connectivity intensity of the pixels (local connectivity Low pixel) corresponding to the items (b) to (f) as "Low".

The classification method is not limited to the method of the embodiment for classifying the pixels into the local connectivity Hi pixel and the local connectivity Low pixel. It is assumed that, in the local connectivity calculating section 122, a proper classification method is adopted according to the discrimination among the image attributes.

The local connectivity calculating section 122 stores the calculated local connectivity intensity in the data storage section 124, thereby updating the local connectivity data 126 (S308).

The processing steps (S304 to S308) are repeatedly performed to all the pixels of the image data 111 (loop 2: S302 to S310), whereby the processing (S104 of FIG. 6) in which the local connectivity calculating section 122 calculates the local connectivity intensity is ended.

The processing in which the image attribute discrimination section 123 discriminates the image attributes (S106 of FIG. 6) will be described in detail.

Figure 12:
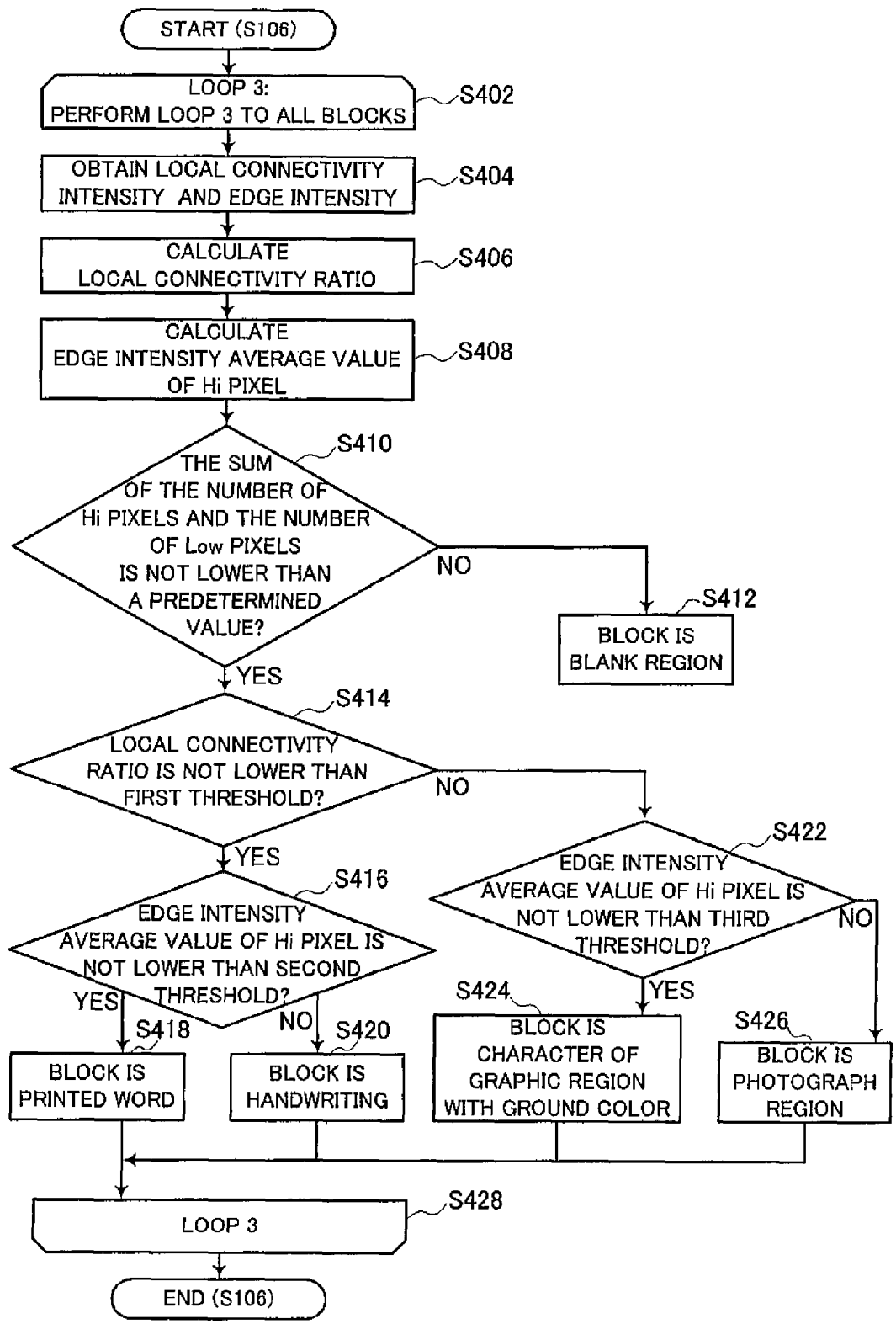
FIG. 12 is a flowchart of an example of processing in which an image attribute discrimination section of the embodiment discriminates among image attributes.

FIG. 12 is a flowchart of an example of the processing in which the image attribute discrimination section 123 of the embodiment discriminates among the image attributes.

FIGS. 13A to 13D explain that the image attribute discrimination section 123 of the embodiment discriminates among the image attributes.

The image attribute discrimination section 123 discriminates among the image attributes in each block including the plurality of pixels using the local connectivity intensity and the edge intensity of each pixel in the block.

Specifically, as illustrated in FIG. 12, the image attribute discrimination section 123 divides the image data 111 into a plurality of blocks, and the image attribute discrimination section 123 repeatedly performs the following processing steps (S404 to S426) to all the blocks (loop 3: S402 to S428). At this point, it is assumed that each block includes 8-by-8 pixel, and it is assumed that the image attribute discrimination section 123 determines the size of the block according to the size, resolution, and detection accuracy of the scanned document.

The image attribute discrimination section 123 obtains the local connectivity intensity of each pixel from the local connectivity data 126 and obtains the edge intensity of each pixel from the edge data 125 (S404).

The image attribute discrimination section 123 calculates a ratio (hereinafter referred to as a local connectivity ratio) of the pixel (local connectivity Hi pixel) in which the local connectivity intensity becomes "Hi" and the pixel (local connectivity Low pixel) in which the local connectivity intensity becomes "Low" from the obtained local connectivity intensity of each pixel (S406). That is, the local connectivity ratio is a value in which the number of pixels of the local connectivity Hi pixel is divided by the number of pixels of the local connectivity Low pixel.

The image attribute discrimination section 123 calculates an edge intensity average value that is of an average value of the edge intensity of each of the local connectivity Hi pixels from the obtained edge intensity of each pixel (S408).

The image attribute discrimination section 123 determines whether the sum of the number of local connectivity Hi pixels and the number of local connectivity Low pixels in the block is not lower than the predetermined number of pixels (S410).

When the sum of the numbers of pixels in the block is lower than the predetermined number of pixels (NO in S410), the image attribute discrimination section 123 determines that the block is a "blank region" (S412). For example, the predetermined number of pixels is the number of pixels corresponding to 50% of the number of pixels in the block.

That is, when the local connectivity Hi pixel or the local connectivity Low pixel does not exist in the block, or when the number of pixels is extremely small compared with the block size, the image attribute discrimination section 123 regards the block as an uninterested blank region not to discriminate among the image attributes. The case where the sum of the number of local connectivity Hi pixels or the number of local connectivity Low pixels is extremely small in the block means the case where the pixels that are defined as the absence of the edge direction consist mostly of the block.

When the sum of the numbers of pixels in the block is not lower than the predetermined number of pixels (YES in S410), the image attribute discrimination section 123 determines whether the local connectivity ratio is not lower than a first threshold (S414).

Figure 13A:
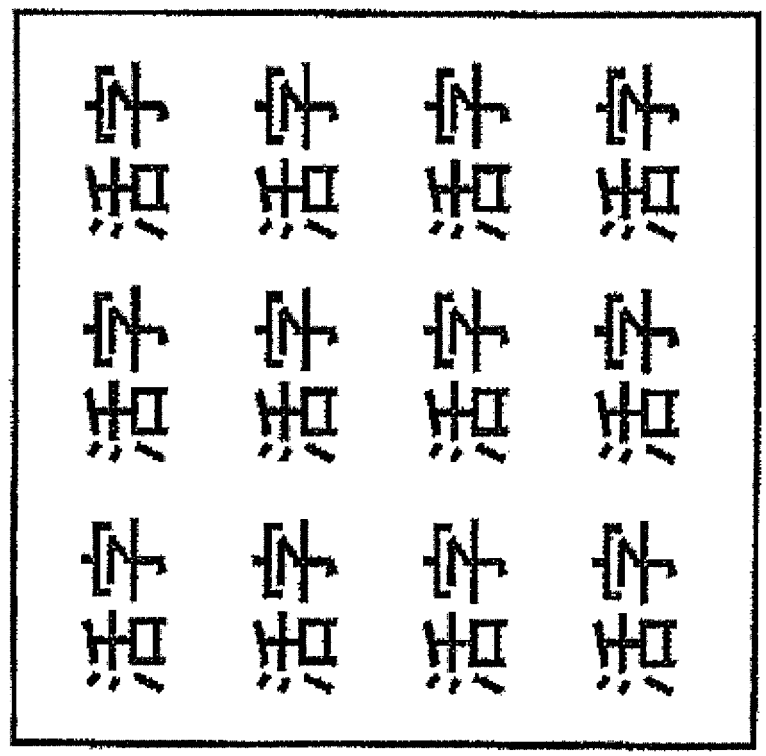
FIG. 13A explains processing in which the image attribute discrimination section of the embodiment discriminates among the image attributes.
Figure 13B:
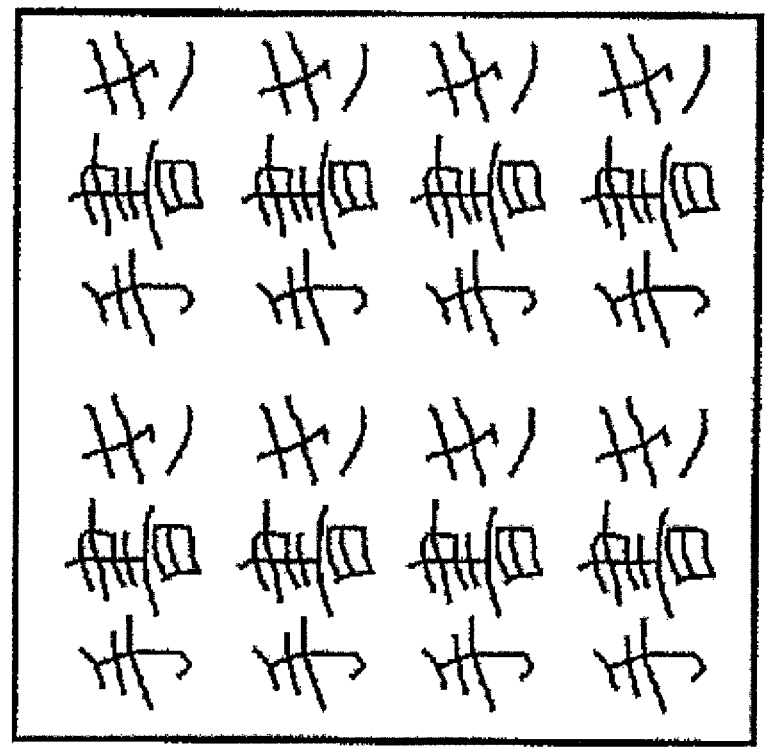
FIG. 13B explains that the image attribute discrimination section of the embodiment discriminates among the image attributes.

When the local connectivity ratio is not lower than the first threshold (YES in S414), the image attribute discrimination section 123 determines that the image attribute of the block is a character region with colorless background. This is attributed to the fact that the number of pixels, in which the edge directions are continuously aligned in an outline portion of the character object while the edge direction changes frequently or rapidly as the characteristic of the character region with colorless background, is relatively small as illustrated in FIGS. 13A and 13B.

The image attribute discrimination section 123 further determines whether the edge intensity average value of the local connectivity Hi pixel is not lower than a second threshold (S416).

When the edge intensity average value of the local connectivity Hi pixel is not lower than the second threshold (YES in S416), the image attribute discrimination section 123 determines that the image attribute of the block is a printed word region (S418). This is attributed to the fact that the number of pixels, in which a change in density between adjacent pixels is large while the edge becomes steep as the characteristic of the printed word, is relatively large compared with handwriting as illustrated in FIGS. 13A and 13B.

The reason the determination is made by not the edge intensity average value of all the pixels but the edge intensity average value of the local connectivity Hi pixel is that a difference in edge intensity emerges easily in the outline portion of the character object and the outline portion corresponds to the local connectivity Hi pixels in which the edge directions are continuously aligned.

When the edge intensity average value of the local connectivity Hi pixel is lower than the second threshold (NO in S416), the image attribute discrimination section 123 determines that the image attribute of the block is a handwriting region (S420). This is attributed to the fact that the number of pixels, in which the change in density between adjacent pixels is small while the edge becomes gentle as the characteristic of the handwriting, is relatively large compared with the printed word as illustrated in FIGS. 13A and 13B. For the same reason, the determination is made by not the edge intensity average value of all the pixels but the edge intensity average value of the local connectivity Hi pixel.

When the local connectivity ratio is lower than the first threshold (NO in S414), the image attribute discrimination section 123 determines that the image attribute of the block is a character or graphic region with ground color or a photograph region. This is because the characteristic of the character region with colorless background does not emerge.

Figure 13C:
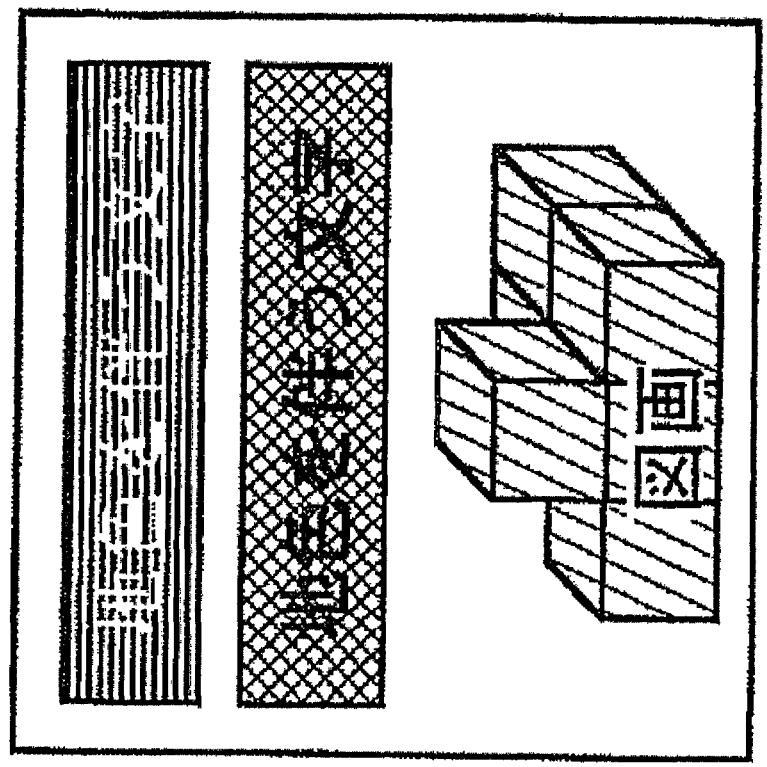
FIG. 13C explains processing in which the image attribute discrimination section of the embodiment discriminates among the image attributes.
Figure 13D:
FIG. 13D explains processing in which the image attribute discrimination section of the embodiment discriminates among the image attributes.

The reason the characteristic of the character or graphic region with ground color or the photograph region is not matched with the characteristic of the character region with colorless background is that the outline portion of the character or graphic object is adjacent to the ground color portion having the intermediate gray-scale value and the number of pixels in which the edge directions are continuously aligned is decreased compared with the character region with colorless background as illustrated in FIGS. 13C and 13D.

The image attribute discrimination section 123 further determines whether the edge intensity average value of the local connectivity Hi pixel is not lower than a third threshold (S422).

When the edge intensity average value of the local connectivity Hi pixel is not lower than the third threshold (YES in S422), the image attribute discrimination section 123 determines that the image attribute of the block is the character or graphic region with ground color (S424). This is attributed to the fact that the number of pixels, in which the change in density between adjacent pixels is large while the edge becomes steep, is relatively large compared with the outline portion of the photograph corresponding to the local connectivity Hi pixel of the photograph region in the outline portion of the character or graphic object corresponding to the local connectivity Hi pixel of the character or graphic region with ground color as illustrated in FIGS. 13C and 13D.

When the edge intensity average value of the local connectivity Hi pixel is lower than the third threshold (NO in S422), the image attribute discrimination section 123 determines that the image attribute of the block is the photograph region (S426). This is attributed to the fact that the number of pixels, in which the change in density between adjacent pixels is small while the edge becomes gentle, is relatively large compared with the outline portion of the character or graphic object corresponding to the local connectivity Hi pixel of the character or graphic region with ground color in the outline portion of the photograph corresponding to the local connectivity Hi pixel of the photograph region as illustrated in FIGS. 13C and 13D.

The processing steps (S404 to S426) are repeatedly performed to all the pixels of the image data 111 (loop 3: S402 to S428), whereby the processing (S106 of FIG. 6) in which the image attribute discrimination section 123 discriminates among the image attributes is ended.

The image attribute discrimination section 123 can discriminate the four types of image attributes, that is, the printed word region, the handwriting region, the character or graphic region with ground color, and the photograph region from one another in each block unit. The image attributes are not always discriminated in block unit, the image attribute discrimination section 123 may discriminate the image attributes with respect to the whole image in order to discriminate the image attributes in the whole of the image.

Examples of the first threshold, the second threshold, and the third threshold will be described below.

FIG. 14 explains examples of the first threshold, second threshold, and third threshold.

As illustrated in FIG. 14, the first threshold that is of the threshold for a local connectivity ratio $\alpha$ is 0.5 in order to determine whether the image attribute is the character region.

The second threshold may be equal to the third threshold. However, it is considered that a value lower than that of the second threshold is effectively used as the third threshold, because the edge intensity of the character or graphic region with ground color or photograph region is probably absolutely lower than the edge intensity of the character region with colorless background.

Therefore, the second threshold that is of the threshold for an edge intensity average value $\beta$ of the local connectivity Hi pixel is 192 in order to determine whether the image attribute is the printed word region or the handwriting region. The third threshold that is of the threshold for the edge intensity average value $\beta$ of the local connectivity Hi pixel is 128 in order to determine whether the image attribute is the character or graphic region with ground color or the photograph region. The second threshold and third threshold are values when the edge intensity is normalized into eight bits.

As described above, the image discrimination device 120 of the present invention discriminates the image attributes in each image attribute discrimination region using the local connectivity intensity and the edge intensity. A large-capacity memory and a large amount of calculation are not necessary to calculate the local connectivity intensity and the edge intensity.

The edge direction or edge intensity is calculated by applying the template type first-order differential filter. A large-capacity memory and a large amount of calculation are not necessary for the calculation in which the template type first-order differential filter is applied.

The degree of alignment between the edge direction of the object processing unit and the edge direction of the surrounding processing unit is calculated as the local connectivity intensity of the object processing unit. Therefore, the local connectivity intensity can simply be calculated.

The image attributes are discriminated from each other using the ratio of the number of processing units having high local connectivity intensity and the number of processing units having low local connectivity intensity. Therefore, the image attributes can be discriminated from each other by the simple calculation in which the ratio is calculated.

The image discrimination device 120 determines that image attribute is the character region when the local connectivity ratio is not lower than the predetermined first threshold. The image discrimination device 120 determines that the image attribute is the character or graphic region with ground color or the photograph region when the local connectivity ratio is lower than the predetermined first threshold. Therefore, the character region and the character or graphic region with ground color or photograph region can be discriminated from each other by a simple determination.

The image attributes are discriminated from each other using the edge intensity average value that is of the average value of the edge intensity of each processing unit having high local connectivity intensity. Therefore, the image attributes can be discriminated by a simple calculation in which the average value of the edge intensity is calculated.

The image discrimination device 120 determines that the image attribute is the printed word region when the local connectivity ratio is not lower than the first threshold and when the edge intensity average value is not lower than the second threshold. The image discrimination device 120 determines that the image attribute is the handwriting region when local connectivity ratio is not lower than the first threshold and when the edge intensity average value is lower than the second threshold. Therefore, it is not necessary to perform the pattern matching in which the character information data is used, but the printed word region and the handwriting region can be discriminated from each other by a simple determination.

The image discrimination device 120 determines that the image attribute is the character or graphic region with ground color when the local connectivity ratio is lower than the first threshold and when the edge intensity average value is not lower than the third threshold. The image discrimination device 120 determines that the image attribute is the photograph region when the local connectivity ratio is lower than first threshold and when the edge intensity average value is lower than the third threshold. Therefore, the character or graphic region with ground color and the photograph region can be discriminated from each other by a simple determination.

As described above, an image discrimination device in which memory capacity and calculation amount are reduced in discriminating among the image attributes can be configured in the present invention. The cost is reduced by reducing the memory capacity.

Although the image discrimination device of the present invention has been described based on an embodiment thereof, the invention is not limited to this embodiment. That is, the currently disclosed embodiment is described only by way of example and is not restrictive. The scope of the present invention is expressed not by the above description but only by the claims, and the scope of the invention includes meanings equivalent to the claims and all the changes within claims.

For example, in the embodiment, the image attribute discrimination section 123 discriminates four types of image attributes, that is, the printed word region, the handwriting region, the character or graphic region with ground color, and the photograph region. However, only for the discrimination of the character region, using only the local connectivity ratio, the image attribute discrimination section 123 may discriminate between two types of image attributes, that is, the printed word region and the handwriting region, or the character or graphic region with ground color and the photograph region.

In the embodiment, the image attribute discrimination section 123 discriminates four types of image attributes, that is, the printed word region, the handwriting region, the character or graphic region with ground color, and the photograph region. However, when the discriminated image is only the character region, the image attribute discrimination section 123 may discriminate only two types of the image attributes, that is, the printed word region and the handwriting region.

Similarly, when the discriminated image is not the character region, the image attribute discrimination section 123 may discriminate only two types of the image attributes, that is, the character or graphic region with ground color and the photograph region.

In the embodiment, after the edge intensity average value of the local connectivity Hi pixel is calculated (S404 to S408 of FIG. 12), the image attribute discrimination section 123 determines whether the sum of the number of local connectivity Hi pixels and the number of local connectivity Low pixels is not lower than the predetermined number of pixels (S410 of FIG. 12). Alternatively, before the edge intensity average value of the local connectivity Hi pixel is calculated (S408 of FIG. 12), for example, before the local connectivity intensity and the edge intensity are obtained (S404 of FIG. 12), the image attribute discrimination section 123 may determine whether the sum of the numbers of pixels is not lower than the predetermined number of pixels (S410 of FIG. 12).

The present invention can be applied as an image discrimination device, particularly as an image discrimination device in which memory capacity and calculation amount are reduced in discriminating among the image attributes.

While the present invention has been described with respect to embodiments thereof, it will be apparent to those skilled in the art that the disclosed invention maybe modified in numerous ways and may assume many embodiments other than those specifically set out and described above. Accordingly, the appended claims cover all modifications that fall within the true spirit and scope of the present invention.

What is claimed is:

1. An image discrimination device comprising:
   an edge calculating section that calculates an edge direction in each processing unit including a predetermined number of pixels of an image;
   a local connectivity calculating section that calculates a local connectivity intensity indicating a degree of alignment with the edge direction of a surrounding processing unit in each of the processing units based on the calculated edge direction; and
   an image attribute discrimination section that discriminates among image attributes in each attribute discrimination region including a predetermined number of processing units of the image using the local connectivity intensity of the processing unit in the attribute discrimination region, wherein
   the local connectivity calculating section sets processing units on both sides perpendicularly adjacent to an edge direction of an object processing unit that are of a processing unit of an object whose local connectivity is calculated to the surrounding processing units, and
   the local connectivity calculating section calculates the degree of alignment of the edge direction of the object processing unit with the edge directions of the surrounding processing units as the local connectivity intensity of the object processing unit.

2. An image discrimination device comprising:
   an edge calculating section that calculates an edge direction in each processing unit including a predetermined number of pixels of an image;
   a local connectivity calculating section that calculates a local connectivity intensity indicating a degree of alignment with the edge direction of a surrounding processing unit in each of the processing units based on the calculated edge direction; and
   an image attribute discrimination section that discriminates among image attributes in each attribute discrimination region including a predetermined number of processing units of the image using the local connectivity intensity of the processing unit in the attribute discrimination region, wherein
   the image attribute discrimination section discriminates among the image attributes in each of the attribute discrimination regions of the image using a ratio of a number of processing units having high local connectivity intensity and a number of processing units having low local connectivity intensity.

3. The image discrimination device according to claim 2, wherein the image attribute discrimination section determines that the image attribute is a character region in each of the attribute discrimination regions of the image when a local connectivity ratio that is of a value in which the number of processing units having high local connectivity intensity is divided by the number of processing units having low local connectivity intensity is not lower than a predetermined first threshold.

4. The image discrimination device according to claim 3, wherein
   the image attribute discrimination section determines that the image attribute is a character or graphic region with ground color or a photograph region in each of the attribute discrimination regions of the image when the local connectivity ratio is lower than the first threshold.

5. An image discrimination device comprising:
   an edge calculating section that calculates an edge direction in each processing unit including a predetermined number of pixels of an image;
   a local connectivity calculating section that calculates a local connectivity intensity indicating a degree of alignment with the edge direction of a surrounding processing unit in each of the processing units based on the calculated edge direction; and
   an image attribute discrimination section that discriminates among image attributes in each attribute discrimination region including a predetermined number of processing units of the image using the local connectivity intensity of the processing unit in the attribute discrimination region, wherein
   the edge calculating section further calculates an edge intensity in each of the processing units of the image,
   the image attribute discrimination section further discriminates among the image attributes in each of the attribute discrimination regions of the image using the edge intensity of the processing unit in the attribute discrimination region, and
   the image attribute discrimination section discriminates among the image attributes in each of the attribute discrimination regions of the image using an edge intensity average value that is of an average value of the edge intensity of each processing unit having high local connectivity intensity in processing units in the attribute discrimination region.

6. The image discrimination device according to claim 5, wherein
   the image attribute discrimination section determines that the image attribute is a printed word region in each of the attribute discrimination regions of the image when a local connectivity ratio that is of a value in which the number of processing units having high local connectivity intensity is divided by the number of processing units having low local connectivity intensity is not lower than a predetermined first threshold and when the edge intensity average value is not lower than a predetermined second threshold, and the image attribute discrimination section determines that the image attribute is a handwriting region in each of the attribute discrimination regions of the image when the local connectivity ratio is not lower than the first threshold and when the edge intensity average value is lower than the second threshold.

7. The image discrimination device according to claim 5, wherein
the image attribute discrimination section determines that the image attribute is a character or graphic region with ground color in each of the attribute discrimination regions of the image when the local connectivity ratio that is of the value in which the number of processing units having high local connectivity intensity is divided by the number of processing units having low local connectivity intensity is lower than a predetermined first threshold and when the edge intensity average value is not lower than a predetermined third threshold, and
the image attribute discrimination section determines that the image attribute is a photograph region in each of the attribute discrimination regions of the image when the local connectivity ratio is lower than the first threshold and when the edge intensity average value is lower than the third threshold.

8. An image discrimination device comprising:
an edge calculating section that calculates an edge direction and an edge intensity in each processing unit including a predetermined number of pixels of an image;
a local connectivity calculating section that calculates a local connectivity intensity indicating a degree of alignment with the edge direction of a surrounding processing unit in each of the processing units based on the calculated edge direction; and
an image attribute discrimination section that discriminates among image attributes in each attribute discrimination region including a predetermined number of processing units of the image using the edge intensity calculated from the local connectivity intensity of the processing unit in the attribute discrimination region, wherein
the local connectivity calculating section sets processing units on both sides perpendicularly adjacent to an edge direction of an object processing unit that are of a processing unit of an object whose local connectivity is calculated to the surrounding processing units, and
the local connectivity calculating section calculates the degree of alignment of the edge direction of the object processing unit with the edge directions of the surrounding processing units as the local connectivity intensity of the object processing unit.

9. An image discrimination device comprising:
an edge calculating section that calculates an edge direction and edge intensity in each processing unit including a predetermined number of pixels of an image;
a local connectivity calculating section that calculates a local connectivity intensity indicating a degree of alignment with the edge direction of a surrounding processing unit in each of the processing units based on the calculated edge direction; and
an image attribute discrimination section that discriminates among image attributes in each attribute discrimination region including a predetermined number of processing units of the image using the edge intensity calculated from the local connectivity intensity of the processing unit in the attribute discrimination region,
wherein the image attribute discrimination section discriminates among the image attributes in each of the attribute discrimination regions of the image using a ratio of the number of processing units having high local connectivity intensity and the number of processing units having low local connectivity intensity.

10. The image discrimination device according to claim 9, wherein the image attribute discrimination section determines that the image attribute is a character region in each of the attribute discrimination regions of the image when a local connectivity ratio that is of a value in which the number of processing units having high local connectivity intensity is divided by the number of processing units having low local connectivity intensity is not lower than a predetermined first threshold.

11. The image discrimination device according to claim 10, wherein the image attribute discrimination section determines that the image attribute is a character or graphic region with ground color or a photograph region in each of the attribute discrimination regions of the image when the local connectivity ratio is lower than the first threshold.

12. An image discrimination device comprising:
an edge calculating section that calculates an edge direction and edge intensity in each processing unit including a predetermined number of pixels of an image;
a local connectivity calculating section that calculates a local connectivity intensity indicating a degree of alignment with the edge direction of a surrounding processing unit in each of the processing units based on the calculated edge direction; and
an image attribute discrimination section that discriminates among image attributes in each attribute discrimination region including a predetermined number of processing units of the image using the edge intensity calculated from the local connectivity intensity of the processing unit in the attribute discrimination region,
wherein the image attribute discrimination section discriminates among the image attributes in each of the attribute discrimination regions of the image using an edge intensity average value that is of an average value of the edge intensity of each processing unit having high local connectivity intensity in processing units in the attribute discrimination region.

13. The image discrimination device according to claim 12, wherein
the image attribute discrimination section determines that the image attribute is a printed word region in each of the attribute discrimination regions of the image when a local connectivity ratio that is of a value in which the number of processing units having high local connectivity intensity is divided by the number of processing units having low local connectivity intensity is not lower than a predetermined first threshold and when the edge intensity average value is not lower than a predetermined second threshold, and
the image attribute discrimination section determines that the image attribute is a handwriting region in each of the attribute discrimination regions of the image when the local connectivity ratio is not lower than the first threshold and when the edge intensity average value is lower than the second threshold.

14. The image discrimination device according to claim 12, wherein
the image attribute discrimination section determines that the image attribute is a character or graphic region with ground color in each of the attribute discrimination regions of the image when the local connectivity ratio that is of the value in which the number of processing units having high local connectivity intensity is divided by the number of processing units having low local connectivity intensity is lower than a predetermined first threshold and when the edge intensity average value is not lower than a predetermined third threshold, and the image attribute discrimination section determines that the image attribute is a photograph region in each of the attribute discrimination regions of the image when the local connectivity ratio is lower than the first threshold and when the edge intensity average value is lower than the third threshold.

* * * * *